(12) United States Patent
Klaas (10) Patent No.: US 11,819,006 B2
(45) Date of Patent: Nov. 21, 2023

(54) METHOD AND CONTROL UNIT FOR CONTROLLING A MOVEABLE CROWD GATE

(71) Applicant: DELAVAL HOLDING AB, Tumba (SE)

(72) Inventor: Ilka Klaas, Tumba (SE)

(73) Assignee: DeLaval Holding AB, Tumba (SE)

( * ) Notice: Subject to any disclaimer, the term of this patent is extended or adjusted under 35 U.S.C. 154(b) by 56 days.

(21) Appl. No.: 17/254,066

(22) PCT Filed: Jun. 14, 2019

(86) PCT No.: PCT/SE2019/050564
§ 371 (c)(1),
(2) Date: Dec. 18, 2020

(87) PCT Pub. No.: WO2019/245431
PCT Pub. Date: Dec. 26, 2019

(65) Prior Publication Data
US 2021/0259196 A1    Aug. 26, 2021

(30) Foreign Application Priority Data

Jun. 19, 2018    (SE) .................... 1850742-6

(51) Int. Cl.
*A01K 1/00* (2006.01)
*A01K 1/12* (2006.01)
*A01K 29/00* (2006.01)

(52) U.S. Cl.
CPC .............. *A01K 1/0029* (2013.01); *A01K 1/12* (2013.01); *A01K 29/005* (2013.01)

(58) Field of Classification Search
CPC ........ A01K 1/0029; A01K 1/12; A01K 29/005
See application file for complete search history.

(56) References Cited

U.S. PATENT DOCUMENTS 5,622,141 A * 4/1997 Lareva ............... A01K 1/0029
119/843
6,516,744 B1   2/2003 Bjork et al.
(Continued)

FOREIGN PATENT DOCUMENTS

| EP | 0 920 807 | 6/1999 |
| EP | 1 230 851 | 8/2002 |
| EP | 2 798 948 | 11/2014 |

OTHER PUBLICATIONS

International Search Report for PCT/SE2019/050564 dated Sep. 6, 2019, 4 pages.
(Continued)

*Primary Examiner* — Joshua D Huson
*Assistant Examiner* — Alanna K Peterson
(74) *Attorney, Agent, or Firm* — NIXON & VANDERHYE (57) ABSTRACT

A method and control unit for controlling a moveable crowd gate of a holding area at an entrance of a milking parlour at a farm where the control unit obtains information from at least one sensor regarding animals present in the holding area, determines a stress level among the animals in the holding area, based on the obtained information, and controls movement of the crowd gate, via an actuator configured to adjust position of the moveable crowd gate, based on the determined stress level.

14 Claims, 9 Drawing Sheets

(56) References Cited

U.S. PATENT DOCUMENTS

| | | |
|---|---|---|
| 2011/0308465 A1 | 12/2011 | Siddell |
| 2016/0192612 A1 | 7/2016 | Siddell |
| 2017/0156288 A1 | 6/2017 | Singh |
| 2018/0333244 A1* | 11/2018 | Hanks .................... A61D 17/00 |

OTHER PUBLICATIONS

Written Opinion of the ISA for PCT/SE2019/050564 dated Sep. 6, 2019, 6 pages.
Search Report for SE 1850742-6 dated Nov. 27, 2018, 2 pages.

* cited by examiner

METHOD AND CONTROL UNIT FOR CONTROLLING A MOVEABLE CROWD GATE

This application is the U.S. national phase of International Application No. PCT/SE2019/050564 filed Jun. 14, 2019 which designated the U.S. and claims priority to SE Patent Application No. 1850742-6 filed Jun. 19, 2018, the entire contents of each of which are hereby incorporated by reference.

TECHNICAL FIELD

This document discloses a method and a control unit. More particularly, a method and a control unit are described, for controlling a moveable crowd gate of a holding area at an entrance of a milking parlour at a farm.

BACKGROUND

In an agricultural environment wherein milk is extracted from animals, such as on a dairy farm, the animals may be kept in a holding area, before they are allowed to enter a milking parlour wherein milk is extracted. The holding area may sometimes have a moveable crowd gate for encouraging the animals to move within the holding area, towards the milking parlour in order to get milked.

Animals may have a walking order towards the milking parlour, which can differ from the milking order. This means that animals in the holding area need to have enough time to resettle from walking order, to milking order. If, for example, the crowd gate moves too fast, or a group of animals gets too little space, the animals will experience stress which may trigger a flight instinct among the animals. This increases the risk of claw lesions due to that animals may step on each other's claws or twist the claws in painful angles. Stress in the holding area will also negatively affect milk let-down during a subsequent milking. To ensure a relaxed and stress free passage through the holding area to the milking parlour, a gentle and modest attitude when encouraging the animals to enter the milking parlour is appropriate. At the same time, extensive waiting in the holding area cannot be accepted as it would delay the milking and decrease the milk production per time unit at the farm.

It would for these reasons, to avoid stress and injuries among the animals in the holding area and increase milk production, be desirable to find a manner to better control the crowd gate, giving the animals sufficient space while still ensuring a consistent animal flow towards the milking parlour entrance.

SUMMARY

It is therefore an object of this invention to solve at least some of the above problems and provide an improved control of a moveable crowd gate.

According to a first aspect of the invention, this objective is achieved by a control unit for controlling a moveable crowd gate of a holding area at an entrance of a milking parlour at a farm. The control unit is configured to obtain information from at least one sensor regarding animals present in the holding area. Further, the control unit is configured to determine a stress level among the animals in the holding area, based on the obtained information. The control unit is also configured to control a movement of the crowd gate, via an actuator configured to adjust position of the moveable crowd gate, based on the determined stress level.

According to a second aspect of the invention, this objective is achieved by a method for controlling a moveable crowd gate of a holding area at an entrance of a milking parlour at a farm. The method comprises obtaining information from at least one sensor regarding animals present in the holding area. Further, the method also comprises determining a stress level among the animals in the holding area, based on the obtained information: In addition, the method furthermore comprises controlling movement of the crowd gate, based on the determined stress level.

Thanks to the described aspects, by estimating stress level among the animals in the holding area, e.g. by detecting head movements and/or heart rates among the animals, the crowd gate movement can be adjusted in order to reduce animal stress. The crowd gate movements may be stopped or moved backwards to give the animals more space to calm down.

The improved better control of the moveable crowd gate will reduce stress caused by pushing the cows, giving them sufficient space while still ensuring a consistent cow flow towards and through the milking parlour entrance. This will result in better claw health and better milk let-down.

Other advantages and additional novel features will become apparent from the subsequent detailed description.

FIGURES

Embodiments of the invention will now be described in further detail with reference to the accompanying figures, in which.

DETAILED DESCRIPTION

Embodiments of the invention described herein are defined as a method, and a control unit, which may be put into practice in the embodiments described below. These embodiments may, however, be exemplified and realised in many different forms and are not to be limited to the examples set forth herein; rather, these illustrative examples of embodiments are provided so that this disclosure will be thorough and complete.

Still other objects and features may become apparent from the following detailed description, considered in conjunction with the accompanying drawings. It is to be understood, however, that the drawings are designed solely for purposes of illustration and not as a definition of the limits of the herein disclosed embodiments, for which reference is to be made to the appended claims. Further, the drawings are not necessarily drawn to scale and, unless otherwise indicated, they are merely intended to conceptually illustrate the structures and procedures described herein.

Figure 1A:
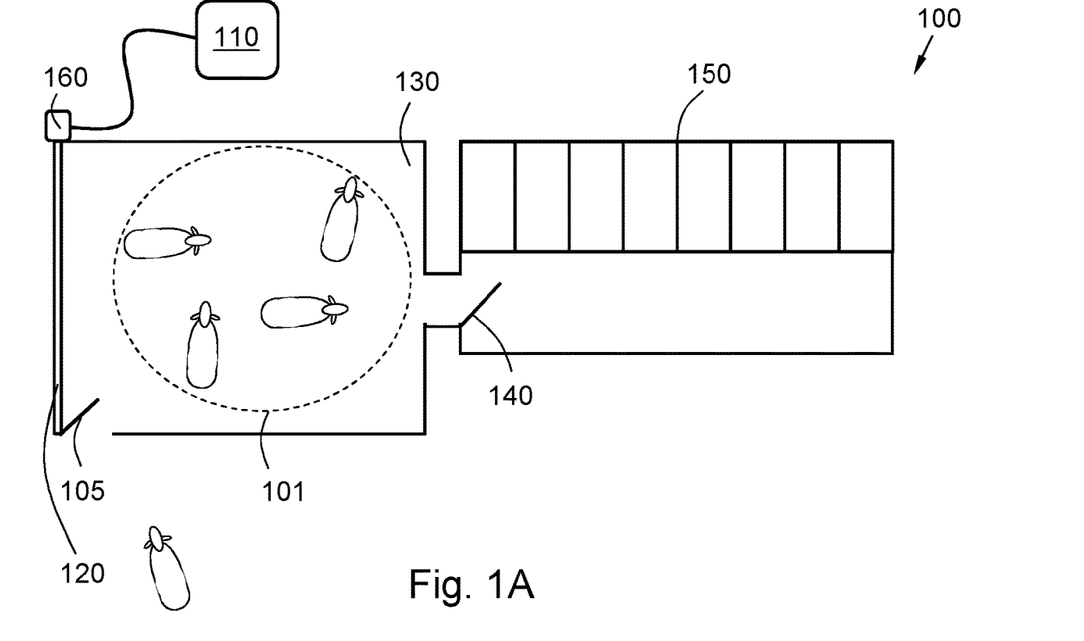
FIG. 1A illustrates an example of a farm comprising a milking parlour and a holding area leading thereto, according to an embodiment of the invention.

FIG. 1A illustrates a schematic scenario of a farm 100, as regarded from an above perspective. The farm 100 comprises a milking parlour 150 and a holding area 130 with an entrance 140 in between. The holding area 130, which may sometimes also be referred to as waiting area, holding pen, etc., is used to hold animals waiting to be milked.

A herd of animals 101 is allowed to enter the holding area 130 through an entrance 105. In some embodiments, a predetermined number of animals 101 may be allowed to enter the holding area 130, where after the entrance 105 to the holding area 130 may be closed.

"Animal" may be any arbitrary type of animal such as e.g. a domesticated animal; however, the herein provided non-limiting examples primarily relates to non-human milk and/or meat producing animals such as cow, goat, sheep, camel, dairy buffalo, yak, etc.

The milking parlour 150 may comprise a stanchion, a milking robot, a rotary milking platform, etc.

The size of the holding area 130 may be adjusted by means of a moveable crowd gate 120, arranged to be moveable towards and away from the entrance 140 to the milking parlour 150. When the crowd gate 120 is moved towards the entrance 140 to the milking parlour 150, the size of the holding area 130 occupied by the animals 101 is decreased, and when moved away from the entrance 140 to the milking parlour 150, the size of the holding area occupied by the animals 101 is increased.

The moveable crowd gate 120 is operable to form one side of the holding area 130. The moveable crowd gate 120 may move in relation to the entrance 140 along an axis substantially parallel to two other sides of the holding area 130, and may for example rest on rails along the walls, floor or ceiling of the holding area 130. However, the moveable crowd gate 120 may alternatively be supported by wheels running on the floor, or in any other feasible manner. The moveable crowd gate 120 may in some alternative embodiments be arranged on an autonomous vehicle, configured to guide the animals 101 towards the entrance 140 to the milking parlour 150.

Figure 1B:
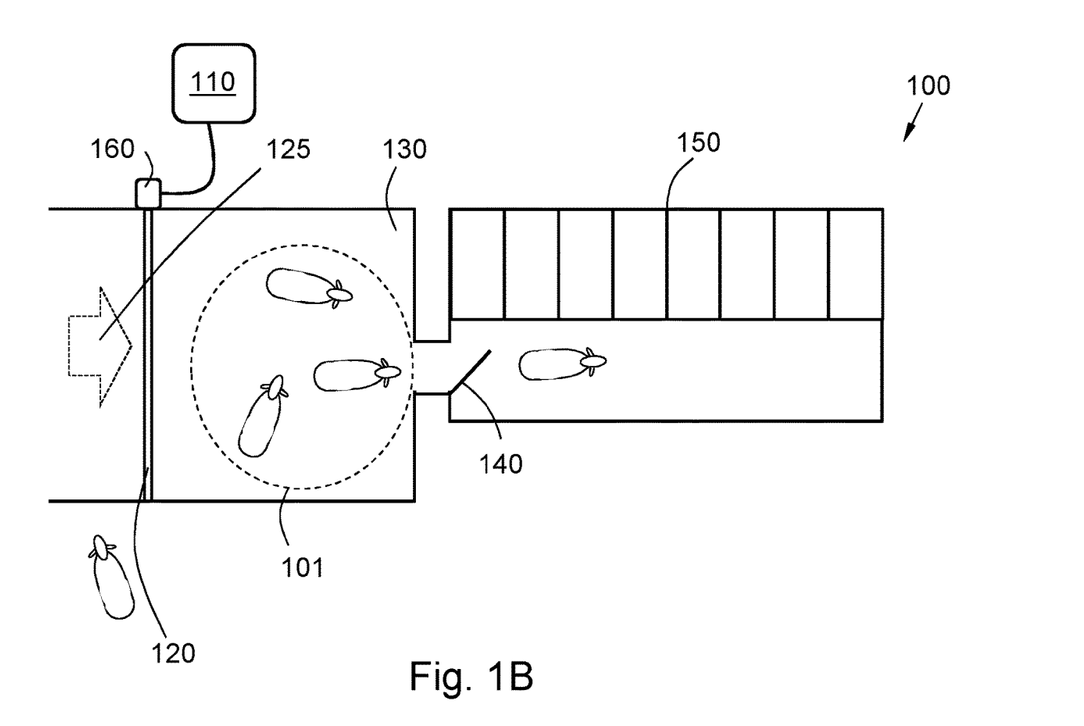
FIG. 1B illustrates an example of a farm comprising a milking parlour and a holding area leading thereto, according to an embodiment of the invention.

An actuator 160, such as an electrical/pneumatic/hydraulic/engine, may cause the moveable crowd gate 120 to move from a starting position (as illustrated in FIG. 1A), wherein the animals 101 are allowed to enter the holding area 130, in a first direction 125 towards the entrance 140 of the milking parlour 150 (as illustrated in FIG. 1B). The animals 101 are thereby encouraged to enter the milking parlour 150 through the entrance 140. The movements such as for example direction, speed, height, oscillations, vibrations etc., of the moveable crowd gate 120 is controlled by a control unit 110, based on various sensor detections, as will be further explained in conjunction with presentation of the illustrative scenarios of FIGS. 2B, 3A-3C and FIG. 6. The actuator 160 may be distinct from the control unit 110, but may receive commands from the control unit 110 via a wired or wireless communication interface.

In some alternative embodiments, the moveable crowd gate 120 may close the entrance 105 to the holding area 130 while moving in the first direction 125. It may thereby be avoided that animals 101 escape through the entrance 105 to the holding area 130, instead of going to the milking parlour 150 through the entrance 140. It is also avoided that additional animals enter the holding area 130 while the effective area of the holding area 130 has been reduced, thereby potentially causing panic, or at least increased stress, in the holding area 130.

The moveable crowd gate 120 may in some embodiments comprise a pressure sensor, proximity sensor or the like, arranged on the crowd gate 120, which may serve as an emergency stop for the movements of the crowd gate 120 in case an animal 101 is in the way. The movement may be halted for a predetermined or configurable period of time. It may thereby be avoided that animals 101 get hurt by the crowd gate 120, or get stuck in the crowd gate 120. The emergency stop may trigger an emergency alarm, engaging the attention of the farmer.

It may be noted that the emergency stop is not to be regarded as a movement control of the moveable crowd gate 120, but rather as a separate emergency stop, in order to avoid injuries among the animals 101. The emergency stop has no relation to the stress level of the animals 101 in the herd.

The moveable crowd gate 120 may furthermore, in some embodiments comprise loudspeakers for encouraging the animals 101 to move towards the entrance 140 of the milking parlour 150. In case stress is detected among the animals 101, relaxing music may be played in order to calm the animals 101, thereby reducing the stress level.

Figure 2A:
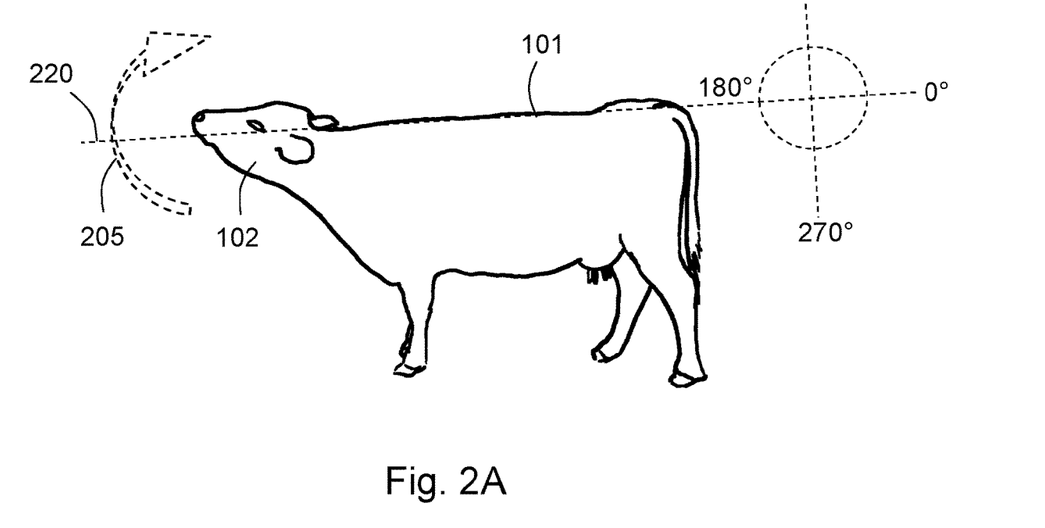
FIG. 2A illustrates an example of an upwards head movement of an animal.

FIG. 2A illustrates a stressed animal 101, which is moving its head 102 in an upwards head movement 105. The upwards head movement 105, as well as an animal 101 keeping the head 102 up high are indicators of stress, e.g. due to crowding, which may occur in the holding area 130. The expression "upwards head movement" is to be interpreted as a head movement from a position where the animal head 102 is moved from below a backline 220 of the animal 101, to a position above the backline 220. The expression "keeping the head 102 up high" is to be interpreted as keeping the head 102 above a certain height e.g. in relation to the backline 220 of the animal 101, to the ground, or in relation to a height which the animal 101 holds its head 102 when being calm. It may further be defined that the head 102 should be held up high for at least a predetermined period of time, such as 3 second, 7 seconds, or similar. The height of the backline 220 of the animals 101 may be assumed as an average of registered values of the animals 101 of a breed or at a farm. Alternatively, or in addition, the height of the backline 220 of the animal 101, or the height difference between the head 102 and the backline of an individual animal 101 may be estimated or determined based on information from one or more sensors, such as cameras and/or tags. The height at which the animal 101 holds its head 102 when calm may be estimated or determined based on information from one or more sensors, and be saved, e.g. in a database. Also, or alternatively, an angle between the backline 220, or an approximately horizontal line, and the neck/head 102 of the animal 101 may be used/determined to identify whether the animal is "keeping the head 102 up high". For example, it could be determined that the animal's head 102 is kept up high when the angle between neck and backline 220 is in the interval of 170-90 degrees, or in the interval 135-90 degrees (assuming that an angle of 180 degrees represents that the animal 101 holds its neck horizontally). Knowing the anatomy of the animal 101, the angle may be derived e.g. from height over the floor of a tag, for example. This information could then be retrieved and used as reference in cases where the animal 101 holding its head 102 up high can be identified, e.g. based on a positioning system or similar.

Figure 2B:
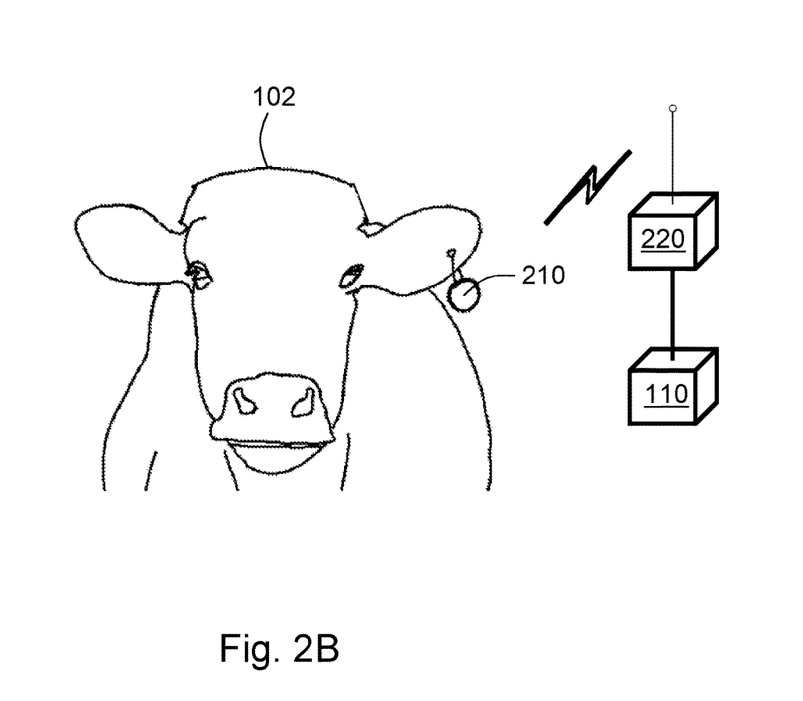
FIG. 2B illustrates an example of an animal and an ear tag, according to an embodiment of the invention.

A tag 210, such as an RFID tag, as illustrated in FIG. 2B may be attached to the head 102 of the animal 101. The tag 210 may measure upward movements of the head 102. Further, the tag 210 may be able to discriminate between jumping of an individual, e.g. when in oestrus. By identifying the number of upwards head movements 105 in the herd of animals 101, and/or the number of heads 102 held up high, e.g. kept above the backline 220 of the animal 101, the stress level at a herd level can be estimated by the control unit 110, and the crowd gate movement may be stopped or even moved backwards to give the animals 101 the required space if a certain threshold of upwards head movements 105, and/or threshold of number of heads 102 held up high is measured. The trigger threshold level may be for example zero animals 101/movements 105; more than 5% of the animal crowd. These are merely some non-limiting examples of the trigger threshold level, which may be configurable and different for different animals depending on e.g. race, farm, design of the holding area, etc. The tag 210 may comprise an accelerometer, a gyroscope or other similar sensor for detecting movements and directions of movements made by the tag 210.

The tag 210 may be attached to one or both ears of the animal 101, arranged in a necklace around the neck of the animal 101, under the hide of the head 102 of the animal 101, around or inside a horn of the animal 101, in a headwear of the animal 101, etc.

The tag 210 may comprise an identifying animal unit, i.e. a transponder comprising an identity reference of the animal 101. The tag 210 may emit wireless signals which may be received by the control unit 110 via a wireless signal transceiver 220.

The wireless signals transmitted between the tag 210 and the wireless signal transceiver 220 may be sent via any convenient wireless communication technology such as Bluetooth (BT), Wireless Universal Serial Bus (Wireless USB), Radio-Frequency Identification (RFID), Wi-Fi, etc.

By identifying the number of upwards head movement 105 and/or heads held up high, the stress level can be estimated and the crowd gate movement may be adjusted, e.g. by being slowed down, stopped or even moved backwards to give the animals 101 the necessary space, e.g. when a threshold limit is exceeded.

Figure 2C:
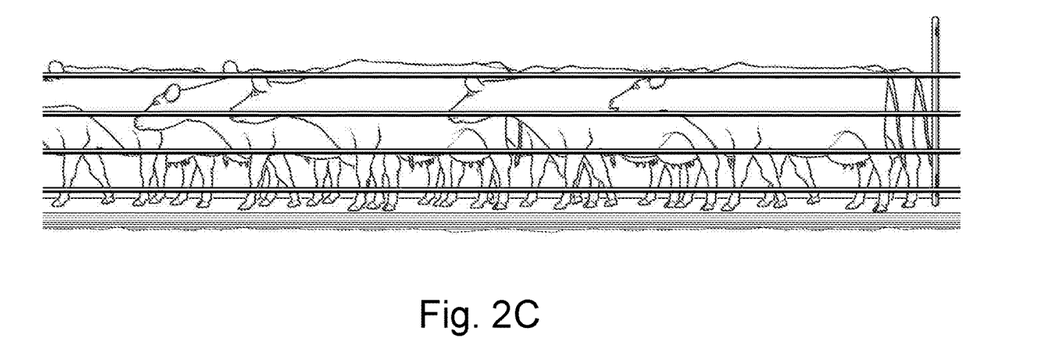

FIG. 2C illustrates a herd of relaxed animals 101 situated in the holding area 130 and walking in serene harmony towards the milking area 150. It may in particular be noted that the animals 101 are keeping their heads 102 below the respective backline 220 of the animal 101.

Figure 2D:
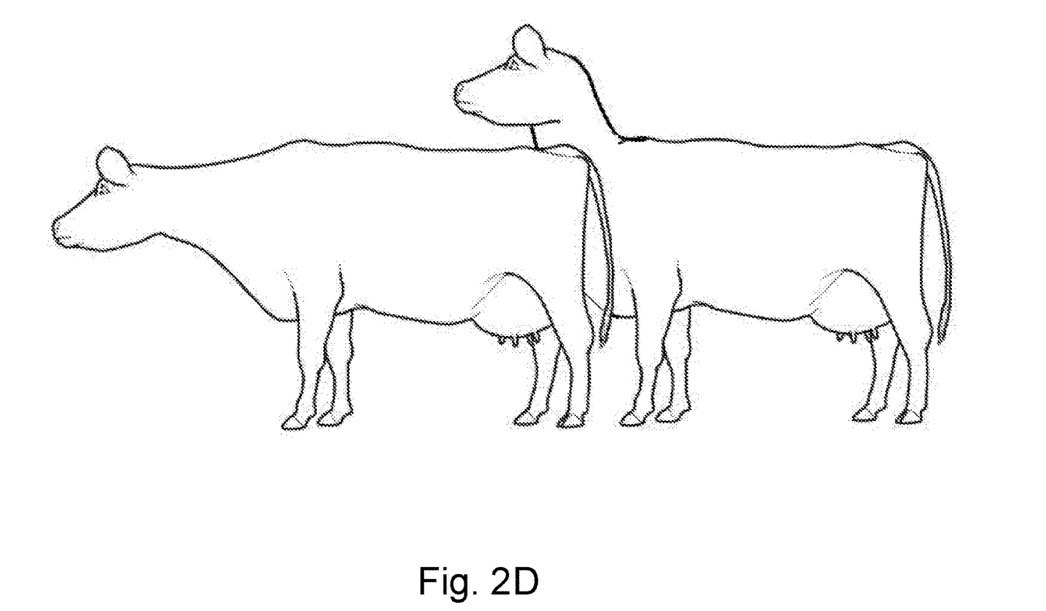

FIG. 2D illustrates a first animal 101 (to the left in the illustration), being relaxed; and a second animal 101 (to the right) having the head 102 up high, raised well above the backline 220, which may be interpreted as the animal 101 being in a state of stress.

Figure 3A:
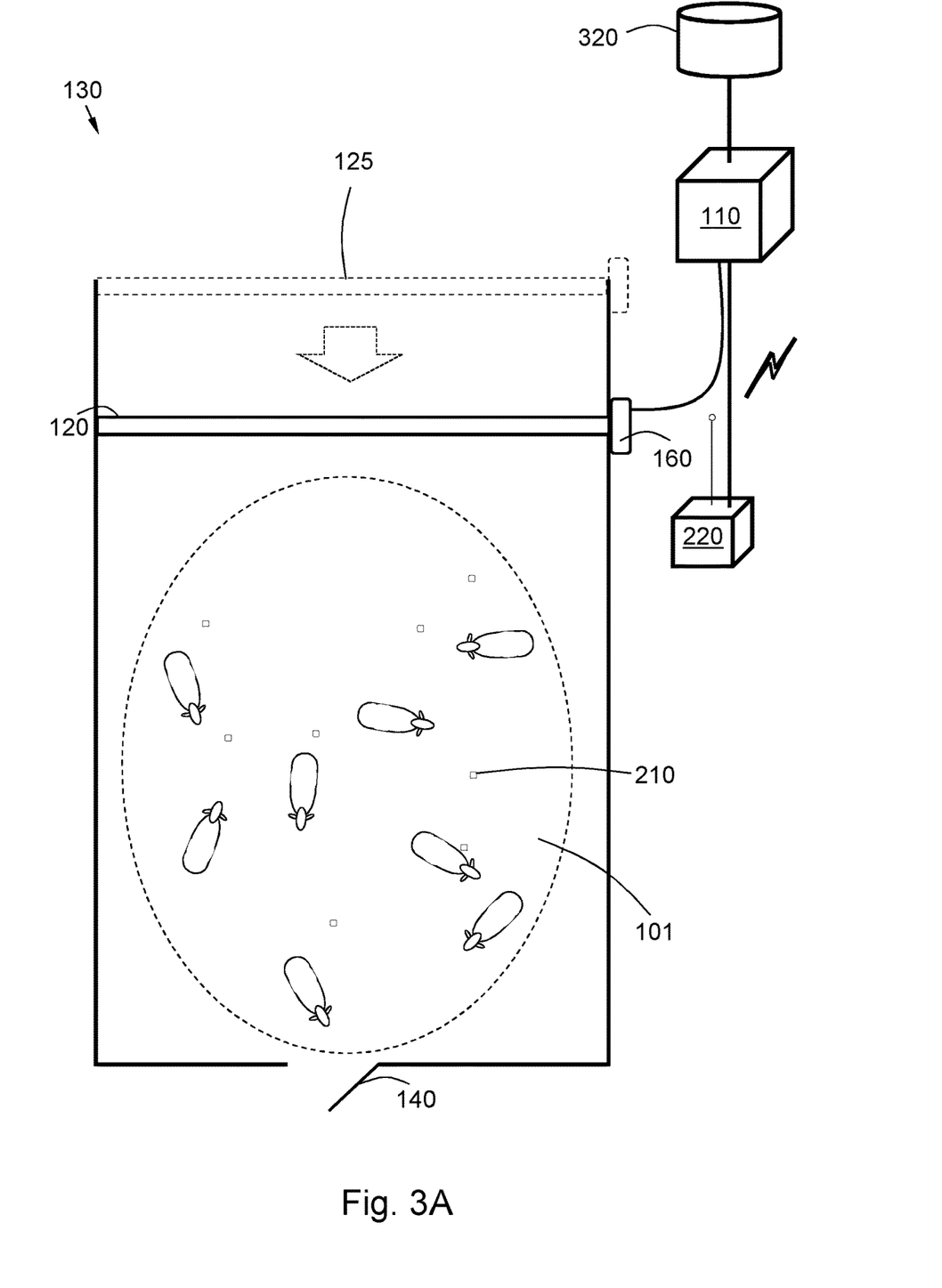
FIG. 3A illustrates an example of a holding area with a moveable crowd gate, according to an embodiment of the invention.

FIG. 3A illustrates a holding area 130 as regarded from an above perspective, according to an embodiment.

The crowd gate 120 has, in the illustrated example, been moved by the actuator 160 in the first direction 125 towards the entrance 140 of the milking parlour 150. The movement of the crowd gate 120 may be initiated by the control unit 110 in some embodiments, e.g. when a sufficient number of animals 101 have been gathered in the holding area 130, and/or at a certain time period, and/or when an estimated stress level of the animals 101 is estimated to be lower than a threshold limit. Alternatively, the movement of the crowd gate 120 in the first direction 125 may be initiated by a farmer or other similar person at the farm 100.

Figure 4:
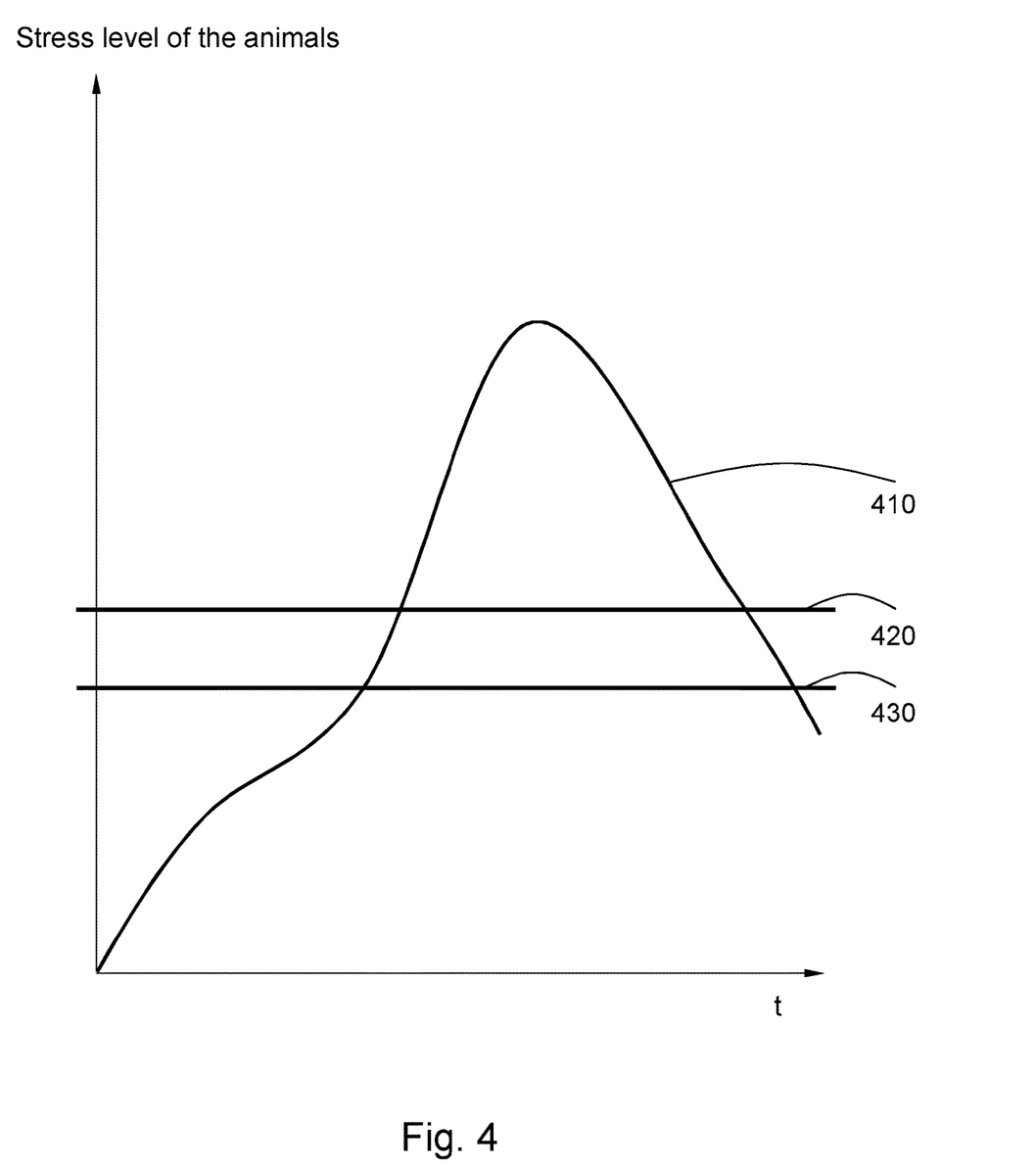
FIG. 4 illustrates stress level of animals in a graph.

In the illustrated embodiment, the animals 101, or at least some of them, may have a tag 210 attached to the head 102 of the animal 101. When an upwards head movement 105 made by an animal 101 in the holding area 130 is detected, a signal comprising this information may be transmitted via the transceiver 220 to the control unit 110. A stress level of the animals 101 may then be estimated by the control unit 110, based on the obtained information from the animal tags 210. The estimated stress level of the animals 101, at a herd level, may then be compared with a threshold limit, as illustrated in FIG. 4, and further discussed in the corresponding text segment.

The tags 210 of the animals 101 may in some embodiments determine heart rate of the respective animals 101 and provide the heart rate to the control unit 110, which then may utilise the information concerning heart rate of the animals 101 for estimating stress level of the animals 101. In some embodiments, the heart rate of the animals 101 may be determined by a separate sensor, i.e. a heart rate monitor, and then provided to the control unit 110.

The control unit 110 may be connected to a database 320, wherein various obtained sensor information may be stored. Also, for example information concerning the stress threshold limit may be stored in the database 320.

Figure 3B:
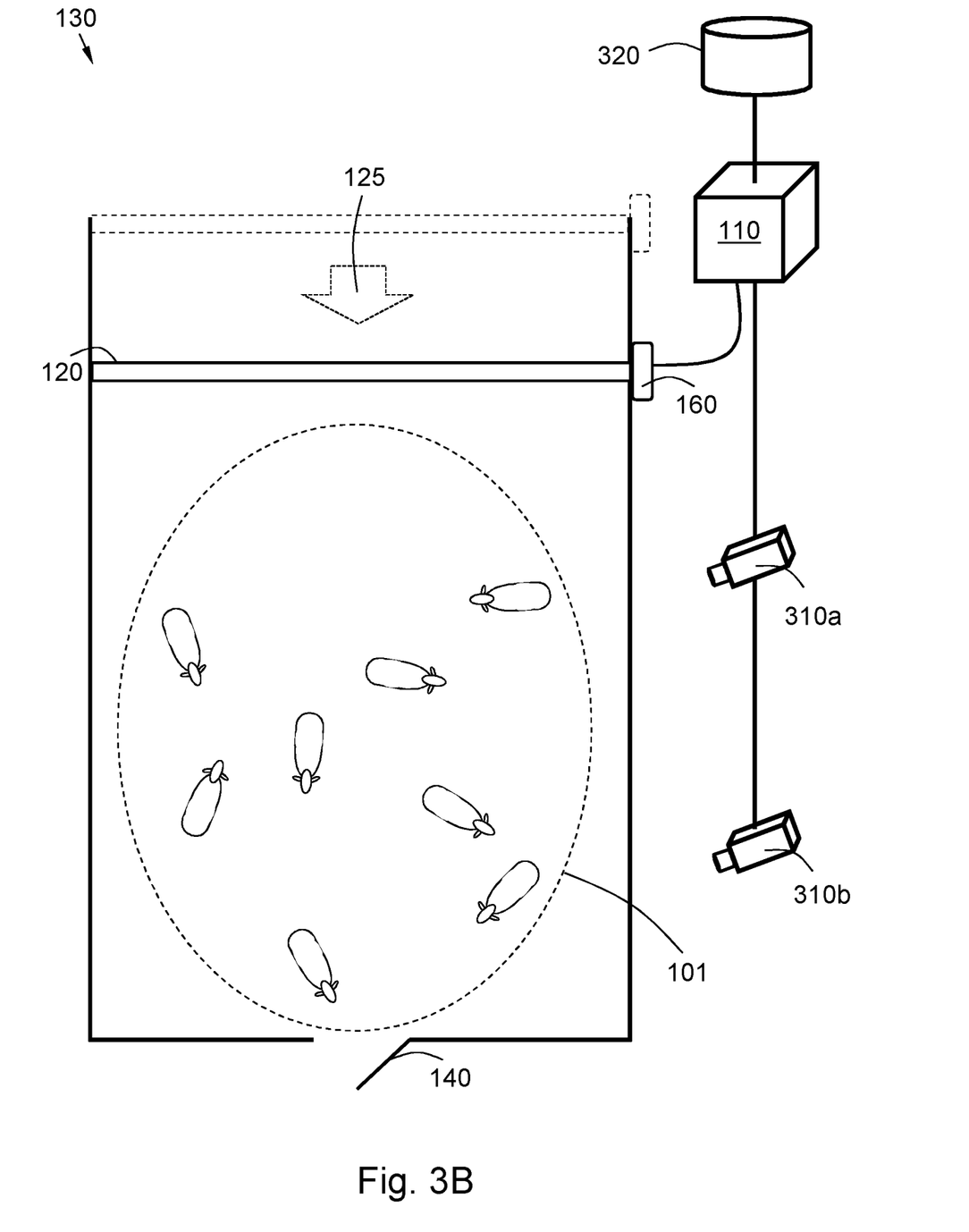
FIG. 3B illustrates an example of a holding area with a moveable crowd gate, according to an embodiment of the invention.

FIG. 3B illustrates a holding area 130 as regarded from an above perspective, according to an embodiment.

The setting of the holding area 130 and the system comprising the control unit 110 may be similar to the setting of the holding area 130 illustrated in FIG. 3A, but wherein sensors 310a, 310b in form of a camera are utilised. The sensors 310a, 310b may thus comprise one or several cameras, which may be of the same or different types, directed towards the holding area 130. The camera may be e.g. a stereo camera, an infrared camera, a video camera, a radar, a lidar, an ultrasound device, a time-of-flight camera, a Passive Infrared (PIR) sensor or similar device, in different embodiments. The sensor 310a, 310b may also, or alternatively be configured to emit a continuous wave of microwave radiation and detect motion through the principle of Doppler radar; or emit an ultrasonic wave and detect and analyse the reflections; or by a tomographic motion detection system based on detection of radio wave disturbances, to mention some possible implementations.

The sensor 310a, 310b may capture images, such as e.g. a sequence of images and/or a video sequence of the heads 102 of the animals 101 and by image recognition/computer vision and object recognition, upwards head movements 105 of the animals 101 may be detected.

The computer vision may be performed by the control unit 110, for estimating the stress level of the animals 101, based on the detected upwards head movements 105. The computer vision may comprise methods for acquiring, processing, analysing, and understanding images and, in general, high-dimensional data from the real world in order to produce numerical or symbolic information. A theme in the development of this field has been to duplicate the abilities of human vision by electronically perceiving and understanding an image. Understanding in this context means the transformation of visual images (the input of retina) into descriptions of the world that can interface with other thought processes and elicit appropriate action. This image understanding can be seen as the disentangling of symbolic information from image data using models constructed with the aid of geometry, physics, statistics, and learning theory. Computer vision may also be described as the enterprise of auto-mating and integrating a wide range of processes and representations for vision perception.

Figure 3C:
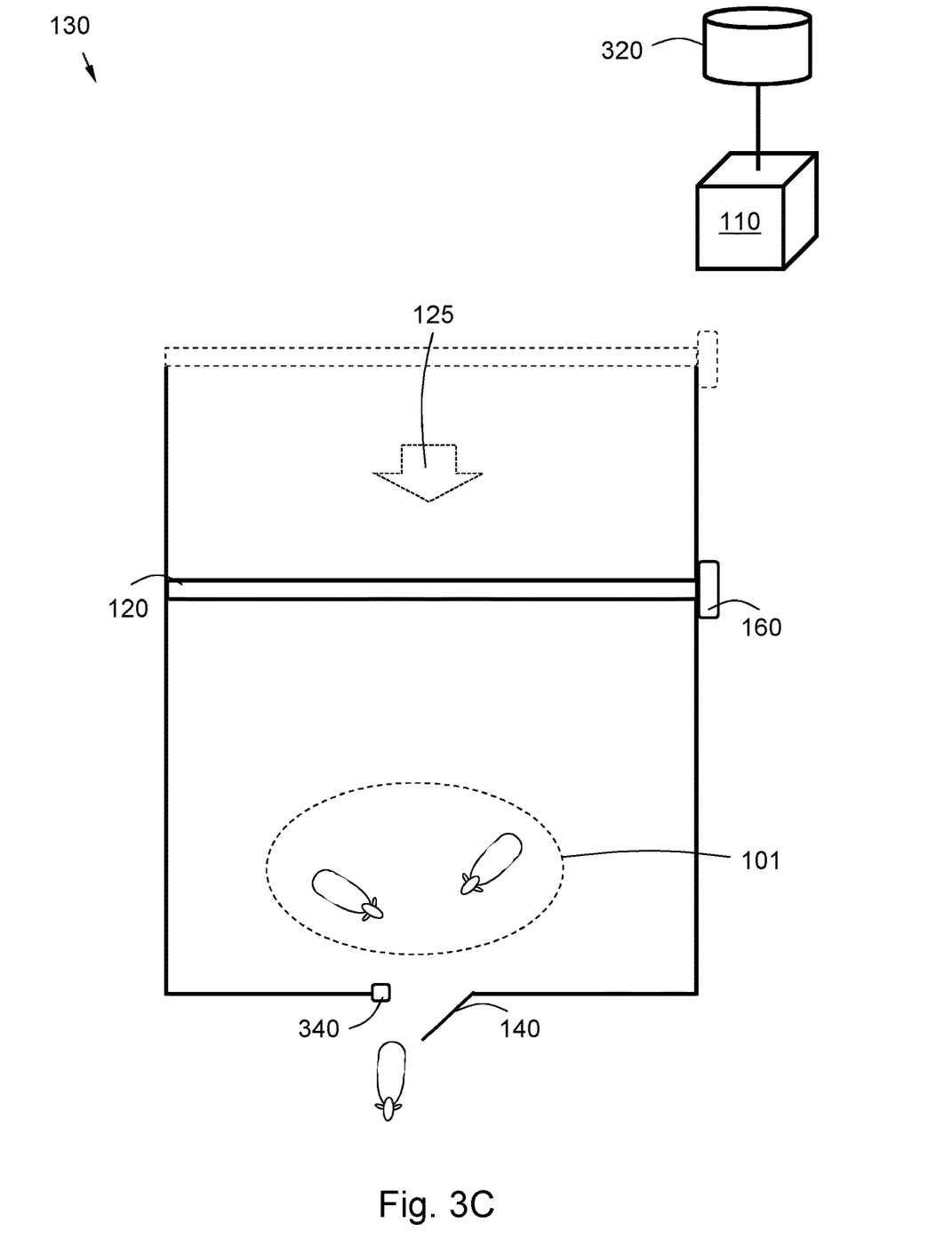
FIG. 3C illustrates an example of a holding area with a moveable crowd gate, according to an embodiment of the invention.

FIG. 3C illustrates a holding area 130 as regarded from an above perspective according to an embodiment.

The setting of the holding area 130 and the system comprising the control unit 110 may be similar to the setting of the holding area 130 illustrated in FIG. 3A, and/or FIG. 3B but wherein a sensor 340 is detecting the passage through the entrance 140 between the holding area 130 and the milking parlour 150.

The sensor 340 may comprise e.g. a photocell, a proximity sensor, a camera or similar device, capable of detecting passage of an animal 101 through the entrance 140 to the milking parlour 150.

The sensor 340 may be connected to the control unit 110 via a wired or wireless connection in different embodiments.

The control unit 110 may utilise the animal flow (passage per time unit) through the entrance 140 to control the movements of the crowd gate 120. Further, or alternatively, the control unit 110 may keep track of the number of animals 101 remaining within the holding area 130, by determining the number of animals 101 present in the holding area 130 when commencing the movements of the crowd gate 120 in the first direction 125, and subtracting the animals 101 passing the entrance 140. Also, the number of remaining animals 101 in the holding area 130 may be used for controlling the movements of the crowd gate 120.

As long as there is enough animal flow through the entrance 140, i.e. an animal flow exceeding a first animal flow limit (number of passed animals within a time period), the crowd gate 120 does not need to move towards the entrance 140 of the milking parlour 150, or even push animals 101. Instead, the animals 101 may find their way to the milking parlour 150 themselves.

However, when the animal flow is lower than a second animal flow limit, the movement of the crowd gate 120 in the first direction 125 towards the entrance 140 may be triggered. Alternatively, the speed of the crowd gate 120, in the first direction 125, may be increased.

The improved better control of the crowd gate 120 will reduce stress caused by pushing the animals 101 in the holding area 130, giving them sufficient space while still ensuring a consistent cow flow through the milking parlour entrance 140. This will result in better claw health and better milk let-down.

FIG. 4 illustrates stress level 410, at a herd level, among the animals 101 in the holding area 130 of the farm 100. The stress level 410 is estimated by the control unit 110, based on sensor information obtained from at least one sensor 210, 220, 310a, 310b, 330a, 330b, 330c, 340 regarding the animals 101 in the holding area 130. The sensors 210, 220, 310a, 310b, 330a, 330b, 330c, 340 may in turn detect animals 101 making upwards head movements 105.

The stress level 410 may for example be determined by e.g., the number of specific head movements 105 within a time interval; the number of animals 101 making upwards head movements 105 within a time interval; the number of animal heads 102 held up high, e.g. kept above the backline 220 of the animal 101, for a predetermined period of time, within a time interval; number of animals 101 within the holding area 130; an estimated heart rate of animals 101 within the holding area 130 such as e.g. an estimated average heart rate of the animals 101, a peak heart rate of one individual animal 101, an increased average heart rate among a subset of the animals 101 in the herd, and/or increased average heart rate among the subset of the animals 101 in the herd, having the highest heart rate. In some embodiments, the stress level 410 may be determined by a combination of some, or all of the above enumerated parameters. The expression "increased heart rate" is to be understood as "a heart rate exceeding a heart rate threshold limit". The expression "average heart rate" is to be understood as the heart rate determined during a time period, which may be configurable or predetermined time period length.

In the graph, a threshold limit 420 of the stress level is illustrated. The threshold limit 420 may be predetermined or configurable in different embodiments. The control unit 110 may compare the determined stress level 410 of the animals 101 in the holding area 130 with the threshold limit 420 and adjust the movement of the crowd gate 120 by reducing speed of, or completely stopping the movement of the crowd gate 120, when the determined stress level 410 exceeds the threshold limit 420. In some embodiments, the crowd gate 120 may also be moved in reversed direction, away from the entrance 140 of the milking parlour 150; or upwards in relation to the floor of the holding area 130. Thereby, the efficient area of the holding area 130 may be increased when stress is estimated among the animals 101. Crowding and the risk of claw lesions is thereby reduced.

Further, a third threshold limit 430 of the stress level is illustrated in the graph. In some embodiments, the control unit 110 may compare the stress level 410 of the animals 101, after having discontinued or retracted movements of the crowd gate 120, with the third threshold limit 430. In case the stress level 410 is lower than the second threshold limit 430, the movement of the crowd gate 120 may be resumed in the first direction 125 towards the entrance 140 of the milking parlour 150.

Thereby, movements of the crowd gate 120 may be controlled by the control unit 110, based on the stress level 410 of the animals 101.

Figure 5:
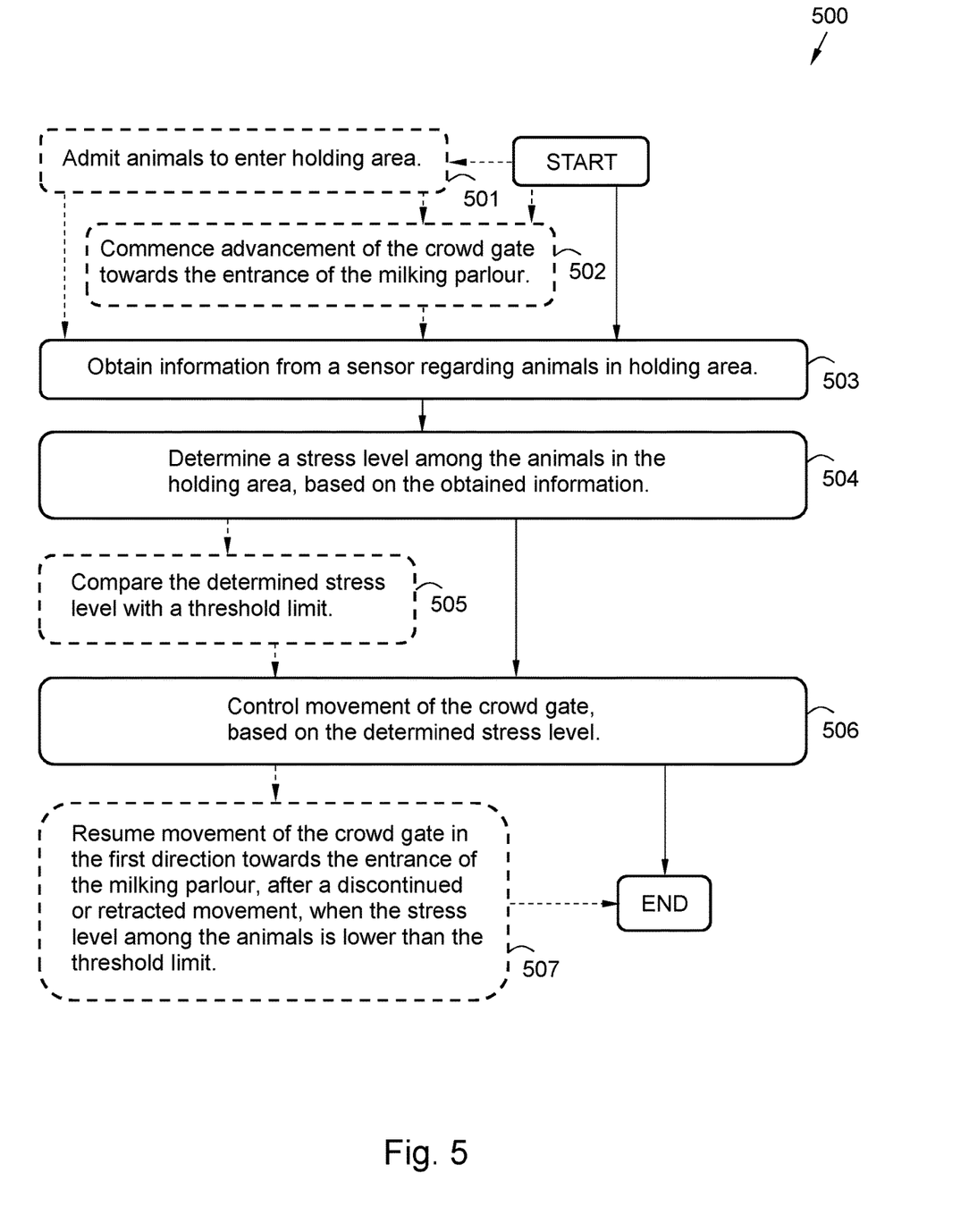
FIG. 5 is a flow chart illustrating an embodiment of a method.

FIG. 5 illustrates an example of a method 500 according to an embodiment. The flow chart in FIG. 5 shows the method 500 executed in a control unit 110 of a system for controlling a moveable crowd gate 120 of a holding area 130 at an entrance 140 of a milking parlour at a farm 100.

The control unit 110 may continuously, or at certain time intervals, monitor and estimate stress level of animals 101 in the holding area 130.

In order to correctly control the moveable crowd gate 120, the method 500 may comprise a number of steps 501-507. However, some of these steps 501-507 are optional and may be performed solely in some alternative embodiments, like e.g. steps 501-502, 505 and/or 507. Further, the described steps 501-507 may be performed in a somewhat different chronological order than the numbering suggests; step 503 may for example be performed before, or simultaneously with the optional step 502, etc. The method 500 may comprise the subsequent steps:

Step 501, which is an optional part of the method 500, may be performed/regarded as part of the method 500 in some embodiments, comprises admitting a number of animals 101 to enter the holding area 130.

The allowed number of animals 101 may be predetermined and/or configurable and may be the same or different at different times of the day, and/or the time of the year. Typically, the allowed number of animals 101 may correspond to the number of milking places in the milking parlour 150.

By only admitting the allowed/predetermined number of animals 101, it is avoided that the holding area 130 becomes crowded already before the moveable crowd gate 120 has started to move.

Step 502, which also is an optional part of the method 500, may be performed/regarded as part of the method 500 in some embodiments, comprises commencing movement of the crowd gate 120 in a first direction 125 towards the entrance 140 of the milking parlour 150.

The commencement of the crowd gate movement may be triggered when the admitted 501 number of animals 101 has entered the holding area 130 in some embodiments. The commencement of the crowd gate movement may alternatively be triggered by a certain time period; and/or by a sufficiently low estimated stress level of the animals 101, e.g. below a threshold.

The process of admitting animals 101 into the holding area 130 and leading the animals 101 to the entrance 140 of the milking parlour 150 is thereby automated.

Step 503 comprises obtaining information from at least one sensor 210, 220, 310a, 310b, 330a, 330b, 330c, 340 regarding animals 101 present in the holding area 130.

The obtained 503 information may relate to a number of animal heads 102, among the animals 101 in the holding area 130, making an upwards head movement 205; and/or a number of animal heads 102 held up high, e.g. kept higher than the backline 220 of the animal 101, for a certain time period.

The upwards head movement 205, and/or the head 102 held up high are stress caused movements, distinct from heat triggered jumping made by other animals on an animal 101 in oestrous.

The obtained 503 information may also, or alternatively relate to the number of animals 101 in the holding area 130, between the moveable crowd gate 120 and the entrance 140 of the milking parlour 150, in relation to the current size of the holding area 130.

In some embodiments, the obtained 503 information relates to an estimated heart rate of animals 101 within the holding area 130.

The control unit 110 may obtain information from a plurality of sensors 210, 220, 310a, 310b, 330a, 330b, 330c, 340 of different types. Thereby, the stress level of the animals 101 may thereby be determined in a more reliable manner.

Step 504 comprises determining a stress level 410 among the animals 101 in the holding area 130, based on the obtained 503 information.

Step 505, which also is an optional part of the method 500, may be performed/regarded as part of the method 500 in some embodiments, comprises comparing the determined 504 stress level 410 with a threshold limit 420.

Step 506 comprises controlling movement of the crowd gate 120, based on the determined 504 stress level 410.

In some embodiments, wherein step 505 has been performed, the adjustment of the movement of the crowd gate 120 may comprise reducing speed, such as e.g. stop, of any movement of the crowd gate 120 towards the entrance 140, when the determined 504 stress level 410 exceeds the threshold limit 420.

The control of the movement of the crowd gate 120 may in some embodiments comprise retracting the crowd gate 140, in a second direction, opposite to the first direction 125, when the determined 504 stress level 410 exceeds the threshold limit 420.

The control 506 of the movement of the crowd gate 120 may in some embodiments be based on an estimated animal flow through the entrance 140 to the milking parlour 150, or a combination of the estimated animal flow through the entrance 140 and the estimated stress level among the animals 101.

Step 507, which also is an optional part of the method 500, may be performed/regarded as part of the method 500 in some embodiments, comprises resuming movement of the crowd gate 120 in the first direction 125 towards the entrance 140 of the milking parlour 150, after a discontinued or retracted movement, or alternatively increasing speed of the movement of the crowd gate 120, when the stress level 410 among the animals 101 is lower than a second threshold limit 430.

Thereby, a continuous movement of the crowd gate 120, based on the estimated stress level of the animals 101 may be assured, leading to a rational animal flow to the milking parlour 150, without exposing the animals 101 for an unnecessary amount of stress. Injuries, such as for example claw lesions because animals 101 may step on each other's claws or twist the claws in painful angles, may thereby be avoided. Further, by reducing the stress level of the animals 101, the milk yield of the animals 101 is increased.

Figure 6:
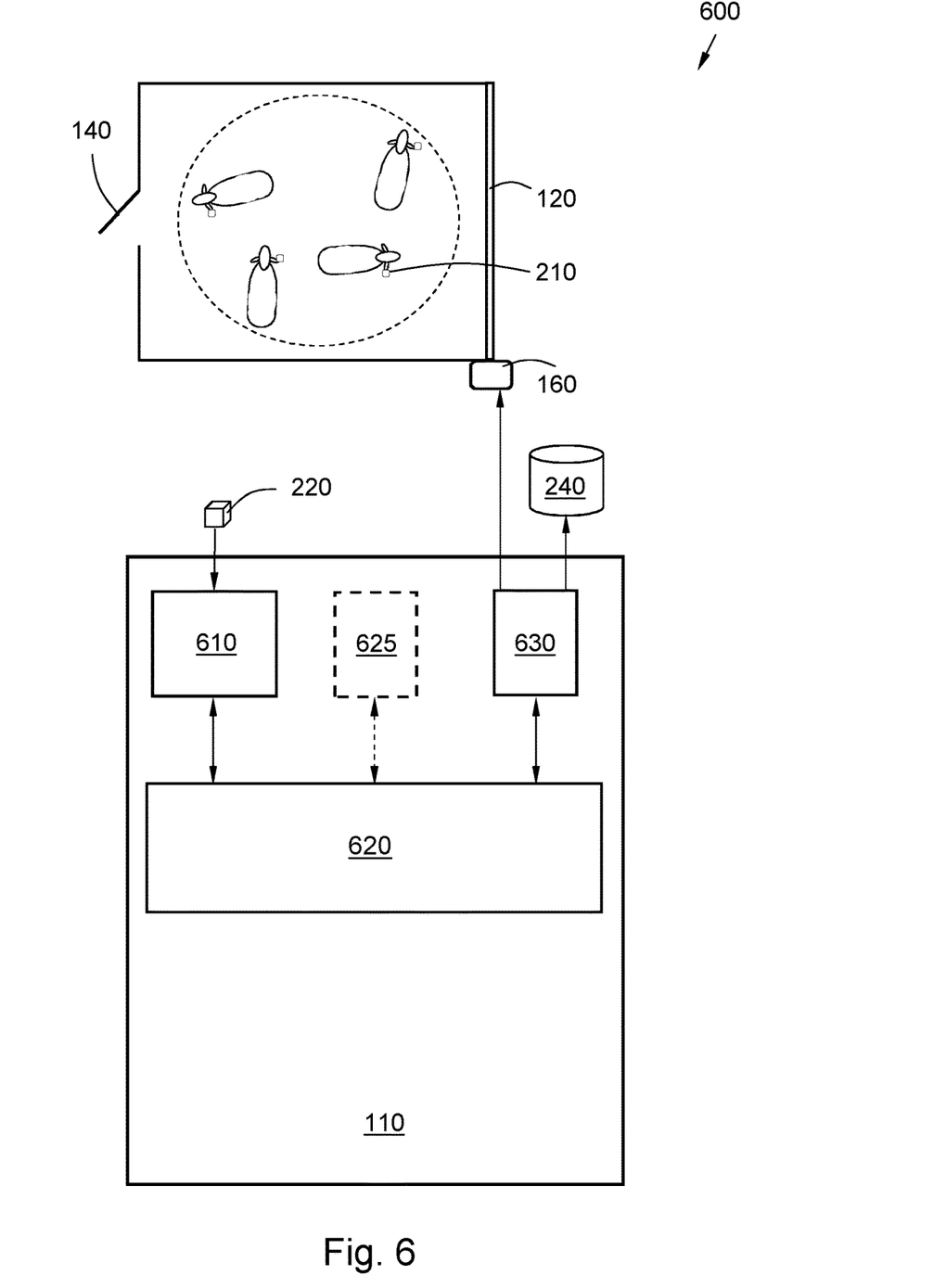
FIG. 6 is an illustration depicting a system according to an embodiment.

FIG. 6 illustrates an embodiment of a system 600 for controlling a moveable crowd gate 120 of a holding area 130 at an entrance 140 of a milking parlour 150 at a farm 100. The system 600 may perform at least some of the previously described steps 501-507 according to the method 500 described above and illustrated in FIG. 5.

The system 600 comprises a control unit 110. The control unit 110 is configured to obtain information from at least one sensor 210, 220, 310a, 310b, 330a, 330b, 330c, 340 regarding animals 101 present in the holding area 130. Further, the control unit 110 is configured to determine a stress level 410 among the animals 101 in the holding area 130, based on the obtained information. Also, the control unit 110 is furthermore configured to control movement of the crowd gate 120, via an actuator 160 configured to adjust position of the moveable crowd gate 120, based on the determined stress level 410.

The control unit 110 may in some embodiments be configured to order the actuator 160 to commence movement of the crowd gate 120 in a first direction 125 towards the entrance 140 of the milking parlour 150.

In some embodiments, the control unit 110 may be configured to compare the determined stress level 410 with a threshold limit 420. Further, the control unit 110 may also be configured to adjust the movement of the crowd gate 120 by reducing speed of the movement of the crowd gate 120 in the first direction 125 towards the entrance 140, when the determined stress level 410 exceeds the threshold limit 420.

The control unit 110 may furthermore be configured to retract the crowd gate 140, via the actuator 160, in a second direction, opposite to the first direction 125, when the determined stress level 410 exceeds the threshold limit 420.

Further, the control unit 110 may be configured to admit a number of animals 101 to enter the holding area 130.

Also, the control unit 110 may be configured to resume movement of the crowd gate 120 in the first direction 125 towards the entrance 140 of the milking parlour 150, after a discontinued or retracted movement, and/or a movement with reduced speed, when the stress level 410 among the animals 101 is lower than a second threshold limit 430.

The obtained information may relate to a number of animal heads 102, among the animals 101 in the holding area 130, making an upwards head movement 205. Also, or alternatively, the obtained information may relate to a number of animal heads 102, among the animals 101 in the holding area 130, are held up high, e.g. higher than the backline of the animal 101.

In some embodiments, the obtained information relates to the number of animals 101 in the holding area 130, between the moveable crowd gate 120 and the entrance 140 of the milking parlour 150 in relation to the current size of the holding area 130.

The obtained information may alternatively relate to an estimated heart rate of animals 101 within the holding area 130.

In some embodiments, the control unit 110 may be configured to control the movement of the crowd gate 120, based on an estimated animal flow through the entrance 140 to the milking parlour 150.

The system 600 may in some embodiments also comprise an actuator 160, configured to adjust position of the moveable crowd gate 120.

Further, the system 600 may comprise at least one sensor 210, 220, 310a, 310b, 330a, 330b, 330c, 340, configured to collect data related to stress of the animals 101 in the holding area 130.

In some alternative embodiments, the system 600 may furthermore comprise the moveable crowd gate 120.

In some alternative embodiments, the system 600 may comprise a database 240, configured to store information related to stress levels of animals 101, number of allowed animals 101 in the holding area 130 at different positions of the moveable crowd gate 120, flow limits of the number of animals 101 passing the entrance 140 of the milking parlour 150, etc. Further, the database 240 may store collected information/data, which may be used for evaluating possible stress factors among the animals 101 and risk factors for claw diseases associated with the holding area 130.

The control unit 110 may comprise a receiver 610 configured for receiving information from the wireless transceiver 220.

The control unit 110 comprises a processing circuit 620 configured for performing various calculations for conducting the method 500 according to at least some of the previously described steps 501-507.

Such processing circuit 620 may comprise one or more instances of a processing circuit, i.e. a Central Processing Unit (CPU), a processing unit, a processing circuit, a processor, an Application Specific Integrated Circuit (ASIC), a microprocessor, or other processing logic that may interpret and execute instructions. The herein utilised expression "processor" may thus represent a processing circuitry comprising a plurality of processing circuits, such as, e.g., any, some or all of the ones enumerated above.

Furthermore, the control unit 110 may comprise a memory 625 in some embodiments. The optional memory 625 may comprise a physical device utilised to store data or programs, i.e., sequences of instructions, on a temporary or permanent basis. According to some embodiments, the memory 625 may comprise integrated circuits comprising silicon-based transistors. The memory 625 may comprise e.g. a memory card, a flash memory, a USB memory, a hard disc, or another similar volatile or non-volatile storage unit for storing data such as e.g. ROM (Read-Only Memory), PROM (Programmable Read-Only Memory), EPROM (Erasable PROM), EEPROM (Electrically Erasable PROM), etc. in different embodiments.

Further, the control unit 110 may comprise a signal transmitter 630. The signal transmitter 630 may be configured for transmitting signals via a wired or wireless communication interface to the actuator 160, the transceiver 220 and/or the database 240.

However, in some alternative embodiments, the system 600 may comprise additional units for performing the method 500 according to steps 501-507.

The above described steps 501-507 to be performed in the system 600 may be implemented through the one or more processing circuits 620 within the control unit 110, together with a computer program for performing at least some of the functions of the steps 501-507. Thus the computer program comprises instructions which, when the computer program is executed by the control unit 110 in the system 600, cause the control unit 110 to carry out the method 500 according to at least some of steps 501-507.

The computer program mentioned above may be provided for instance in the form of a computer-readable medium, i.e. a data carrier carrying computer program code for performing at least some of the steps 501-507 according to some embodiments when being loaded into the one or more processing circuits 620 of the control unit 110. The data carrier may be, e.g., a hard disk, a CD ROM disc, a memory stick, an optical storage device, a magnetic storage device or any other appropriate medium such as a disk or tape that may hold machine readable data in a non-transitory manner. The computer program may furthermore be provided as computer program code on a server and downloaded to the control unit 110 remotely, e.g. over an Internet or an intranet connection.

The terminology used in the description of the embodiments as illustrated in the accompanying drawings is not intended to be limiting of the described method 500; the control unit 110; the computer program; the system 600 and/or the computer-readable medium. Various changes, substitutions and/or alterations may be made, without departing from invention embodiments as defined by the appended claims.

As used herein, the term "and/or" comprises any and all combinations of one or more of the associated listed items. The term "or" as used herein, is to be interpreted as a mathematical OR, i.e., as an inclusive disjunction; not as a mathematical exclusive OR (XOR), unless expressly stated otherwise. In addition, the singular forms "a", "an" and "the" are to be interpreted as "at least one", thus also possibly comprising a plurality of entities of the same kind, unless expressly stated otherwise. It will be further understood that the terms "includes", "comprises", "including" and/or "comprising", specifies the presence of stated features, actions, integers, steps, operations, elements, and/or components, but do not preclude the presence or addition of one or more other features, actions, integers, steps, operations, elements, components, and/or groups thereof. A single unit such as e.g. a processor may fulfil the functions of several items recited in the claims. The mere fact that certain measures or features are recited in mutually different dependent claims, illustrated in different figures or discussed in conjunction with different embodiments does not indicate that a combination of these measures or features cannot be used to advantage. A computer program may be stored/distributed on a suitable medium, such as an optical storage medium or a solid-state medium supplied together with or as part of other hardware, but may also be distributed in other forms such as via Internet or other wired or wireless communication system.

The invention claimed is:

1. A control unit (110) for controlling a moveable crowd gate (120) of a holding area (130) at an entrance (140) of a milking parlour (150), comprising:
   a processing circuit and communication interfaces, configured to communicate with an actuator configured to adjust a position of the crowd gate, and to communicate with a sensor regarding animals (101) present in the holding area (130), said sensor being one of a movement sensor in an animal tag (210) and a camera directed towards the holding area (130),
   wherein the control unit (110) is configured to:
      obtain information from the sensor regarding animals (101) present in the holding area (130), the obtained information relating to one of upward head movements among the animals (101) and one or more heads held up high among the animals (101);
      determine a stress level (410) among the animals (101) in the holding area (130) based on the obtained information;
      compare the determined stress level (410) with a threshold limit (420); and
      control the crowd gate (120), via the actuator (160), based on the determined stress level (410), whereby the control unit (110) causes the crowd gate (120) when the determined stress level (410) exceeds the threshold limit (420) to any one of i) slow a motion of the crowd gate (120) in a first direction (125) towards the entrance (140), ii) stop the motion of the crowd gate (120) in the first direction (125) towards the entrance (140), and iii) retract the crowd gate (120) in a second direction opposite to the first direction (125).

2. The control unit (110) according to claim 1, configured to:
   admit a number of animals (101) to enter the holding area (130).

3. The control unit (110) according to claim 1, configured to:
   resume movement of the crowd gate (120) in the first direction (125) towards the entrance (140) of the milking parlour (150), after a discontinued, speed reduced, or retracted movement, when the stress level (410) among the animals (101) is lower than a second threshold limit (430).

4. The control unit (110) according to claim 1, wherein the obtained information further relates to the number of animals (101) in the holding area (130), between the moveable crowd gate (120) and the entrance (140) of the milking parlour (150).

5. The control unit (110) according to claim 1, wherein the obtained information further relates to an estimated heart rate of animals (101) within the holding area (130).

6. The control unit (110) according to claim 1, further configured to:
   control the movement of the crowd gate (120) based on an estimated animal flow through the entrance (140) to the milking parlour (150).

7. A method (500) for controlling a moveable crowd gate (120) of a holding area (130) at an entrance (140) of a milking parlour (150), the method (500) comprising:
   obtaining (503) information from a sensor regarding animals (101) present in the holding area (130), said sensor being one of a movement sensor in an animal tag (210) and a camera directed towards the holding area (130), the obtained information relating to one of upward head movements among the animals (101) and one or more heads held up high among the animals (101);
   determining (504) a stress level (410) among the animals (101) in the holding area (130) based on the obtained information;
   comparing the determined stress level (410) with a threshold limit (420); and
   determining that the determined stress level (410) exceeds the threshold limit (420), and subsequently controlling (506) the crowd gate (120) via an actuator based on the determined stress level (410), whereby the control unit (110) causes the crowd gate (120) to any one of i) slow a motion of the crowd gate (120) in a first direction (125) towards the entrance (140), ii) stop the motion of the crowd gate (120) in the first direction (125) towards the entrance (140), and iii) retract the crowd gate (120) in a second direction opposite to the first direction (125).

8. The method (500) according to claim 7, further comprising:
   admitting (501) a number of animals (101) to enter the holding area (130).

9. The method (500) according to claim 7, further comprising:
   determining, after a discontinued, speed reduced, or retracted movement of the crowd gate (120), that the stress level (410) among the animals (101) is lower than a second threshold limit (430), and subsequently resuming (507) movement of the crowd gate (120) in the first direction (125) towards the entrance (140) of the milking parlour (150).

10. The method (500) according to claim 7, wherein the obtained information further relates to the number of animals (101) in the holding area (130), between the moveable crowd gate (120) and the entrance (140) of the milking parlour (150).

11. The method (500) according to claim 7, wherein the obtained information further relates to an estimated heart rate of the animals (101) within the holding area (130).

12. The method (500) according to claim 7, wherein the controlling of the movement of the crowd gate (120) is further based on an estimated animal flow through the entrance (140) to the milking parlour (150).

13. A non-transitory computer-readable data storage medium having stored thereon a computer program comprising instructions which, when the computer program is executed by a control unit equipped with a processing circuit and communication interfaces for communicating with at least one sensor and an actuator configured to adjust a position of a moveable crowd gate of a holding area at an entrance of a milking parlour, causes the control unit (110) to carry out the method according to claim 7.

14. A system (600) for controlling a moveable crowd gate (120) of a holding area (130) at an entrance (140) of a milking parlour (150), wherein the system (600) comprises:
   a control unit (110);
   an actuator (160), configured to adjust position of the moveable crowd gate (120); and
   at least one sensor, configured to collect data related to stress of the animals (101) in the holding area (130), wherein the control unit comprises:
   a processing circuit and communication interfaces, configured to communicate with an actuator configured to adjust a position of the crowd gate, and to communicate with at least one of a movement sensor in an animal tag (210) and a camera directed towards the holding area (130), wherein the control unit (110) is configured to:
- obtain information from the sensor regarding animals (101) present in the holding area (130), the obtained information relating to one of upward head movements among the animals (101) and one or more heads held up high among the animals (101);
- determine a stress level (410) among the animals (101) in the holding area (130) based on the obtained information;
- compare the determined stress level (410) with a threshold limit (420); and
- control the crowd gate (120), via the actuator (160), based on the determined stress level (410), whereby the control unit (110) causes the crowd gate (120) when the determined stress level (410) exceeds the threshold limit (420) to any one of i) slow a motion of the crowd gate (120) in a first direction (125) towards the entrance (140), ii) stop the motion of the crowd gate (120) in the first direction (125) towards the entrance (140), and iii) retract the crowd gate (120) in a second direction opposite to the first direction (125).

\* \* \* \* \*